Patented Sept. 9, 1952

2,610,189

UNITED STATES PATENT OFFICE 2,610,189

THIANAPHTHYLMERCAPTOTHIAZOLES

William S. Emerson and Tracy M. Patrick, Jr., Dayton, Ohio, assignors to Monsanto Chemical Company, St. Louis, Mo., a corporation of Delaware No Drawing. Application November 21, 1950, Serial No. 196,953

16 Claims. (Cl. 260—302)

The present invention relates to organic sulfur compounds and deals more particularly with thianaphthyl derivatives of mercaptothiazole, to methods of producing the same and to improved rubber compositions containing the thianaphthyl derivatives.

According to the invention there are prepared new and valuable thianaphthylmercaptothiazoles by submitting thianaphthylthiazolyl disulfides to the action of a reducing agent, substantially according to the scheme:

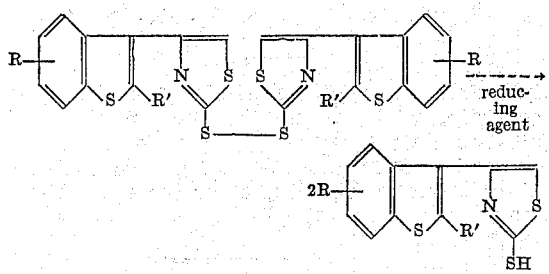

in which R and R' are selected from the class consisting of hydrogen, chlorine, bromine and alkyl radicals of from 1 to 4 carbon atoms.

As disclosed in our copending application Serial No. 196,951, filed of even date, the thianaphthylthiazolyl disulfides are readily prepared by contacting a 3-halomethylthianaphthene compound with ammonium dithiocarbamate. Some of the thianaphthylmercaptothiazole also is obtained in this reaction. As examples of thianaphthylthiazolyl disulfides which may be reduced by the present process to yield thianaphthylmercaptothiazoles may be mentioned 4-(3'-thianaphthyl)-2-thiazolyl disulfide to yield 4-(3'-thianaphthyl)-2-mercaptothiazole; 4-(5'-methyl-3'-thianaphthyl)-2-thiazolyl disulfide to yield 4-(5'-methyl-3'-thianaphthyl)-2-mercaptothiazole; 4-(6'-methyl-3'-thianaphthyl)-2-thiazolyl disulfide to yield 4-(6'-methyl-3'-thianaphthyl)-2-mercapto-thiazole; 4-(6'-chloro-3'-thianaphthyl)-2-thiazolyl disulfide to yield 4-(6'-chloro-3'-thianaphthyl-2-mercaptothiazole; 4-(4'-chloro-3'-thianaphthyl)-2-thiazolyl disulfide to yield 4-(4'-chloro-3'-thianaphthyl)-2-mercaptothiazole; 4-(4'-bromo-3'-thianaphthyl)-2-thiazolyl disulfide to yield 4-(4'-bromo-3'-thianaphthyl)-2-mercaptothiazole; 4-(2'-butyl-3'-thianaphthyl)-2-thiazolyl disulfide to yield 4-(2'-butyl-3'-thianaphthyl)-2-mercaptothiazole; and 4-(5'-chloro-6'-methyl-3'-thianaphthyl)-2-thiazolyl disulfide to yield 4-(5'-chloro-6'-methyl-3'-thianaphthyl)-2-mercaptothiazole.

Treatment of the thianaphthylthiazolyl disulfides with a strong reducing agent yields the thianaphthylmercaptothiazoles in essentially quantitative yields. As reducing agents there may be employed dispersions of finely divided heavy metals in acids e. g., zinc, iron or tin dust in aqueous hydrochloric acid, aqueous sulfuric acid or glacial acetic acid; easily oxidizable salts such as sodium sulfite, sodium nitrite, sodium hypophosphite, or ferrous sulfate; catalytic hydrogenation, for example, in the presence of palladium black, etc. The disulfide is contacted with the reducing agent at ordinary or increased temperature depending upon the nature of the reducing agent until formation of the thianaphthylmercaptothiazole. When working with the metal-acid systems, generally no extraneous solvent or diluent need be employed. Solvents or diluents useful in the catalytic hydrogenation of the disulfide for the production of the thianaphthylmercaptothiazoles include inert, non-reactive media such as benzene, toluene, xylene, hexane, methanol, ethanol, ethyl ether, 1,4-dioxane, etc.

The present thianaphthyl mercaptothiazoles are advantageously employed as rubber vulcanization accelerators. Incorporation of the present compounds into natural or synthetic rubber results in very good cures within comparatively short periods of time. Dispersion of the thianaphthylthiazole mercaptan compounds in rubber stocks is easily effected.

The invention is further illustrated, but not limited, by the following examples:

EXAMPLE 1

*4-(3'-thianaphthyl)-2-mercaptothiazole.*— Excess powdered zinc was added to a solution of 6 g. of 4-(3'-thianaphthyl)-2-thiazolyl disulfide in 200 cc. of glacial acetic acid. After boiling for one hour, the solution was filtered hot and the funnel was washed with boiling acetic acid. The filtrate was diluted to 1 liter with water containing 25 cc. of concentrated hydrochloric acid. The precipitate was separated by filtration, washed four times with water and crystallized from a mixture of ethanol and benzene. The essentially quantitative yield of 4-(3'-thianaphthyl)-2-mercaptothiazole was collected in two crops: I, 5 g., M. P. 221–223° and II, 1 g., M. P. 220–222°.

Anal. Calcd. for $C_{11}H_7NS_3$: C, 53.0; H, 2.81. Found: C, 52.9; H, 2.82.

Other heavy metal-acid reducing systems or other reducing agents, e. g., hydrogen in the presence of palladium as catalyst may be similarly employed to reduce the thianaphthylthiazolyl disulfides to the thianaphthylmercaptothiazoles.

EXAMPLE 2

The accelerating effect of the 4-(3'-thianaphthyl)-2-mercaptothiazole on the vulcanization of rubber was tested by compounding a rubber stock as follows

| | Parts by weight |
|---|---|
| Smoked sheet rubber | 100 |
| Zinc oxide | 5 |
| Sulfur | 3 |
| 4-(3'-thianaphthyl)-2-mercaptothiazole | 1 |

The compounded stock was vulcanized in the usual manner at a temperature of 126° C. The physical properties of the cured products are set forth below:

| Cure time in minutes | Modulus of Elasticity in lbs./sq. in. at Elongations of— | | Ultimate Tensile Strength, p. s. i. | Ultimate Elongation, percent |
|---|---|---|---|---|
| | 500% | 700% | | |
| 30 | 310 | 1,090 | 1,835 | 825 |
| 60 | 500 | 1,805 | 2,650 | 790 |

Other thianaphthylmercaptothiazoles may be similarly employed for accelerating the vulcanization of rubbers. Particularly suitable for this purpose are compounds having the general formula:

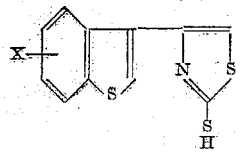

in which X is selected from the class consisting of hydrogen and alkyl radicals of from 1 to 4 carbon atoms.

The present thianaphthylmercaptothiazoles accelerate the vulcanization of rubbers, generally, i. e., natural and synthetic rubber. The synthetic rubbers with which the present compounds may be employed include rubbers such as those obtained by polymerizing a 1,3-butadiene compound either alone or in admixture with other polymerizable compounds which are capable of copolymerizing with the 1,3-butadiene compounds. Examples of 1,3-butadiene compounds which yield synthetic rubbers by polymerization or copolymerization are 1,3-butadiene, chloroprene, piperylene, 2,3-dimethyl-1,3-butadiene, etc. As illustrative of compounds capable of copolymerizing with such 1,3-butadienes are compounds which contain a $CH_2=C<$ group, for example, aryl olefins such as styrene, vinylbiphenyl, and vinylnaphthalene; acrylic or methacrylic acids and their derivatives such as acrylonitrile, methyl methacrylate, and methacrylamide; alkyl vinyl ethers such as methyl vinyl ether; alkyl vinyl ketones such as isopropenyl methyl ketone, aliphatic olefins such as isobutylene, etc.

While the present thianaphthylmercaptothiazoles are particularly valuable as rubber vulcanization accelerators, they are also valuable for a variety of other industrial purposes. The chloro- and bromo-derivatives may be advantageously employed as biological toxicants; the unsubstituted thianaphthylmercaptothiazole and its chlorine and/or alkyl derivatives may be used as intermediates for the production of pharmaceuticals.

What we claim is:

1. Thianaphthylmercaptothiazoles having the general formula

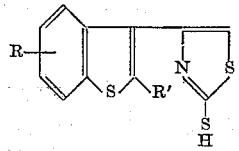

in which R and R' are selected from the class consisting of hydrogen, chlorine, bromine and alkyl radicals of from 1 to 4 carbon atoms.

2. 4-(3'-thianaphthyl)-2-mercaptothiazole.
3. 4-(5'-methyl-3'-thianaphthyl)-2-mercaptothiazole.
4. 4-(6'-methyl-3'-thianaphthyl)-2-mercaptothiazole.
5. 4-(4'-bromo-3'-thianaphthyl)-2-mercaptothiazole.
6. 4-(5'-chloro-6'-methyl-3'-thianaphthyl)-2-mercaptothiazole.
7. The method which comprises contacting with a reducing agent a thianaphthylthiazolyl disulfide having the general formula

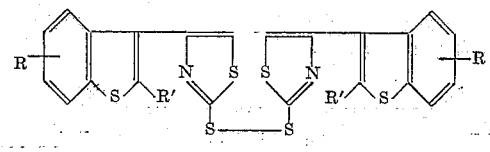

in which R and R' are selected from the class consisting of hydrogen, chlorine, bromine and alkyl radicals of from 1 to 4 carbon atoms and recovering from the reaction product thianaphthylmercaptothiazoles having the general formula:

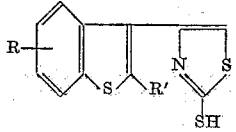

in which R and R' are selected from the class consisting of hydrogen, chlorine, bromine and alkyl radicals of from 1 to 4 carbon atoms.

8. The method which comprises contacting with a metal-acid reducing system a thianaphthylthiazolyl disulfide having the general formula

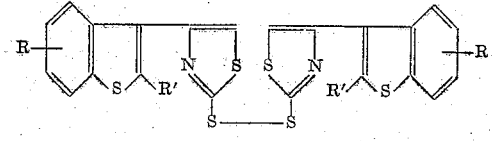

in which R and R' are selected from the class consisting of hydrogen, chlorine, bromine and alkyl radicals of from 1 to 4 carbon atoms and recovering from the reaction product thianaphthylmercaptothiazoles having the general formula

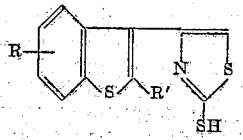

in which R and R' are selected from the class consisting of hydrogen, chlorine, bromine and alkyl radicals of from 1 to 4 carbon atoms.

9. The method which comprises contacting with a zinc-acid reducing system a thianaphthylthiazolyl disulfide having the general formula

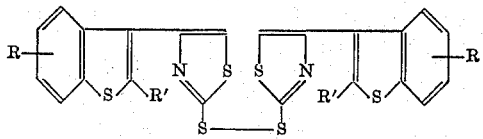

in which R and R' are selected from the class consisting of hydrogen, chlorine, bromine and alkyl radicals of from 1 to 4 carbon atoms and recovering from the reaction product thianaphthylmercaptothiazoles having the general formula

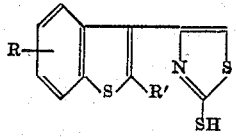

in which R and R' are selected from the class consisting of hydrogen, chlorine, bromine and alkyl radicals of from 1 to 4 carbon atoms.

10. The method which comprises contacting with zinc dust in acetic acid a thianaphthylthiazolyl disulfide having the general formula:

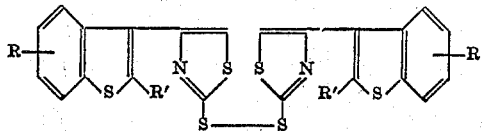

in which R and R' are selected from the class consisting of hydrogen, chlorine, bromine and alkyl radicals of from 1 to 4 carbon atoms and recovering from the reaction product thianaphthylmercaptothiazoles having the general formula

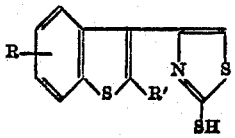

in which R and R' are selected from the class consisting of hydrogen, chlorine, bromine and alkyl radicals of from 1 to 4 carbon atoms.

11. The method which comprises contacting 4-(3'-thianaphthyl)-2-thiazolyl disulfide with a reducing agent and recovering 4-(3'-thianaphthyl)-2-mercaptothiazole from the resulting reaction product.

12. The method which comprises contacting 4-(3'-thianaphthyl)-2-thiazolyl disulfide with zinc in acetic acid and recovering 4-(3'-thianaphthyl)-2-mercaptothiazole from the resulting reaction product.

13. The method which comprises contacting 4-(5'-methyl-3'-thianaphthyl) - 2 - thiazolyl disulfide with a reducing agent and recovering 4-(5'-methyl-3'-thianaphthyl)-2-mercaptothiazole from the resulting reaction product.

14. The method which comprises contacting 4-(6'-methyl-3'-thianaphthyl) - 2 - thiazolyl disulfide with a reducing agent and recovering 4-(6'-methyl-3'-thianaphthyl)-2-mercaptothiazole from the resulting reaction product.

15. The method which comprises contacting 4-(4'-bromo-3'-thianaphthyl)-2-thiazolyl disulfide with a reducing agent and recovering 4-(4'-bromo - 3' - thianaphthyl) - 2 - mercaptothiazole from the resulting reaction product.

16. The method which comprises contacting 4-(5'-chloro-6'-methyl-3'-thianaphthyl)- 2 -thiazolyl disulfide with a reducing agent and recovering 4-(5'-chloro -6'- methyl -3'- thianaphthyl)-2-mercaptothiazole from the resulting reaction product.

WILLIAM S. EMERSON.
TRACY M. PATRICK, Jr.

REFERENCES CITED

The following references are of record in the file of this patent:

UNITED STATES PATENTS

| Number | Name | Date |
|---|---|---|
| 2,196,607 | Mathes | Apr. 9, 1940 |